US008366393B2

(12) United States Patent
Tibbott

(10) Patent No.: US 8,366,393 B2
(45) Date of Patent: Feb. 5, 2013

(54) ROTOR BLADE

(75) Inventor: Ian Tibbott, Staffordshire (GB)

(73) Assignee: Rolls-Royce PLC (GB)

( * ) Notice: Subject to any disclaimer, the term of this patent is extended or adjusted under 35 U.S.C. 154(b) by 592 days.

(21) Appl. No.: 12/651,706

(22) Filed: Jan. 4, 2010

(65) Prior Publication Data

US 2010/0189569 A1 Jul. 29, 2010

(30) Foreign Application Priority Data

Jan. 26, 2009 (GB) .................................. 0901129.7

(51) Int. Cl.
*F01D 5/20* (2006.01)
*B23P 15/02* (2006.01)

(52) U.S. Cl. .................. 416/97 R; 29/889.7; 29/889.72; 164/340

(58) Field of Classification Search .................. 415/115, 415/116; 416/95, 96 R, 97 R; 164/137, 340
See application file for complete search history.

(56) References Cited

U.S. PATENT DOCUMENTS

| | | | | |
|---|---|---|---|---|
| 2,010,094 | A | 8/1935 | Leinweber | |
| 3,264,481 | A * | 8/1966 | Hoegerl | 356/426 |
| 3,635,585 | A | 1/1972 | Metzler, Jr. | |
| 3,854,842 | A | 12/1974 | Caudill | |
| 4,390,320 | A | 6/1983 | Eiswerth | |
| 4,424,001 | A | 1/1984 | North et al. | |
| 4,606,701 | A | 8/1986 | McClay et al. | |
| 5,217,349 | A | 6/1993 | Succi | |
| 5,356,265 | A | 10/1994 | Kercher | |
| 5,460,486 | A * | 10/1995 | Evans et al. | 416/97 R |
| 5,503,527 | A | 4/1996 | Lee et al. | |
| 5,564,902 | A | 10/1996 | Tomita | |
| 5,733,102 | A | 3/1998 | Lee et al. | |
| 5,997,251 | A | 12/1999 | Lee | |
| 6,027,306 | A | 2/2000 | Bunker | |
| 6,059,530 | A | 5/2000 | Lee | |
| 6,190,129 | B1 | 2/2001 | Mayer et al. | |
| 6,340,284 | B1 * | 1/2002 | Beeck et al. | 415/115 |
| 6,616,406 | B2 | 9/2003 | Liang | |
| 6,805,535 | B2 * | 10/2004 | Tiemann | 416/233 |

(Continued)

FOREIGN PATENT DOCUMENTS

| | | | |
|---|---|---|---|
| EP | 1591624 | A1 | 4/2004 |
| EP | 1693552 | A2 | 1/2006 |

(Continued)

*Primary Examiner* — Edward Look
*Assistant Examiner* — William Grigos
(74) *Attorney, Agent, or Firm* — McCormick, Paulding & Huber LLP

(57) ABSTRACT

A gas turbine engine rotor blade has an airfoil portion containing one or more internal conduits. Each conduit extends to an end of the airfoil portion. The blade has a shroud at the end of the airfoil portion for sealing the blade to a facing stationary engine portion. There is a fillet portion which joins the end to the shroud. The fillet portion eases the transition from the outer surface of the airfoil portion to the outer surface of the shroud and has a cavity which extends from each conduit and expands laterally relative thereto. The area of the cavity on a cross-section through the fillet portion perpendicular to the radial direction of the engine and at an expanding part of the cavity is greater than the area of the conduit, or the combined areas of the conduits, on a parallel cross-section at the end of the airfoil portion.

11 Claims, 4 Drawing Sheets

U.S. PATENT DOCUMENTS

| | | | | |
|---|---|---|---|---|
| 6,887,033 | B1 * | 5/2005 | Phillips et al. | 415/115 |
| 7,513,743 | B2 | 4/2009 | Liang | |
| 2001/0048878 | A1 | 12/2001 | Willett et al. | |
| 2005/0232771 | A1 | 10/2005 | Harvey et al. | |
| 2008/0170946 | A1 * | 7/2008 | Brittingham et al. | 416/97 R |

FOREIGN PATENT DOCUMENTS

| | | | |
|---|---|---|---|
| EP | 1865149 | A2 | 12/2007 |
| EP | 1903183 | A2 | 3/2008 |
| GB | 2075129 | A1 | 11/1981 |

* cited by examiner

ROTOR BLADE

CROSS REFERENCE TO RELATED APPLICATION

This application is entitled to the benefit of British Patent Application No. GB 0901129.7, filed on Jan. 26, 2009.

FIELD OF THE INVENTION

The present invention relates to a rotor blade for a gas turbine engine, and particularly a rotor blade having an airfoil portion which contains one or more internal conduits for the transport of cooling air therethrough.

BACKGROUND OF THE INVENTION

The performance of gas turbine engines, whether measured in terms of efficiency or specific output, is improved by increasing the turbine gas temperature. In modern engines, the high pressure (HP) turbine gas temperatures are hotter than the melting point of the material of the blades and vanes, necessitating internal air cooling of these airfoil components. During its passage through the engine, the mean temperature of the gas stream decreases as power is extracted. Nonetheless, in some engines, the intermediate pressure (IP) and low pressure (LP) turbines are also internally cooled.

FIG. 1 shows an isometric view of a typical single stage cooled turbine. Cooling air flows are indicated by arrows.

Internal convection and external films are the prime methods of cooling the airfoils. HP turbine nozzle guide vanes 1 (NGVs) consume the greatest amount of cooling air on high temperature engines. HP blades 2 typically use about half of the NGV flow. The IP and LP stages downstream of the HP turbine use progressively less cooling air.

The HP turbine airfoils are cooled by using high pressure air from the compressor that has by-passed the combustor and is therefore relatively cool compared to the gas temperature. Typical cooling air temperatures are between 800 and 1000 K, while gas temperatures can be in excess of 2100 K.

The cooling air from the compressor that is used to cool the hot turbine components is not used fully to extract work from the turbine. Therefore, as extracting coolant flow has an adverse effect on the engine operating efficiency, it is important to use the cooling air effectively.

In order to obtain high turbine stage efficiency it is also important to control the clearance between the rotor blade tip and the facing stationary shroud segment or seal liner 3, particularly at cruise condition. An effective means of controlling this gap is to employ a shroud 4 on the tip of the blade.

However, as turbine gas temperatures rise, it becomes difficult to maintain the structural integrity of the shroud. One approach is to use relatively large quantities of cooling air to both cool the shroud and to locally dilute the gas temperature coming from the combustor. However, in the case of the coolant used to actively cool the shroud, there is a limit to the amount of coolant that can be physically passed through this relatively slender structure.

SUMMARY OF THE INVENTION

Typically, most high temperature HP turbine blade shrouds are cooled using a combination of internal convection cooling and film cooling, although the latter may not be very effective or efficient due to the adverse pressure gradients and strong secondary flows that exist on or near the shroud's gas washed surfaces.

Most modern shroud cooling configurations bleed coolant from the tip of the blade cooling system through the core printouts. These printouts result from the process by which the hollow blade is cast. From the core printouts, the coolant then flows into a series of intersecting feed conduits, generally embedded into the roots of the fins 5 used to form labyrinth seals or the tip fences 6 on the radially outer surface of the shroud. These feed conduits deliver coolant to arrays of small diameter cooling passages that are drilled from the extremities of the shroud, and intersect with the feed conduits. In some cases these cooling passages have exits that fall short of the shroud's extremities, and heat transfer in these regions is maintained by film cooling. In order that the feed conduits do not pass copious amounts of coolant from their ends, instead of through the cooling passages, the ends are blocked by a welding operation. A small bleed hole is then drilled through the weld to expel air-bourne dust, which could otherwise block the cooling passages.

As gas temperatures and pressures rise in the engine, such shrouds become more difficult to cool, especially at their extremities, where oxidation and thermal cracking can be problematic. A difficulty is that the feed conduits and cooling passages are often too long and the coolant picks up too much heat en-route to the edges of the shroud, resulting in under-cooled extremities. In addition the small diameter cooling passages can suffer from a thickening boundary layer at high length/diameter ratios, causing the heat transfer coefficient to diminish with distance along the passages. Further, the flow that actively cools the shroud extremities has a long tortuous route from the central core printout to the shroud edges, having to negotiate acute intersections between feed conduits and cooling passages. These intersections can reduce coolant levels due to high internal losses and reduced feed pressures.

Another problem with conventional shroud cooling configurations is their poor adaptability when there are changes to the thermal boundary conditions of the blade. For example, if more coolant is required, larger feed conduits may be necessary to pass the increased flow and the shroud geometry has to be made more bulky, particularly in the vicinity of the labyrinth seals and fences. These changes add mass to the shroud structure and increase aerofoil radial stress levels and reduce creep life. Conversely, if the feed conduits are not enlarged but the number of cooling passages is increased, the flow can become throttled or choked within the feed conduits and flow levels in the cooling passages can actually fall.

Furthermore, the cost of manufacture of conventional shroud cooling configurations is increased by the need to drill the feed conduits and then to block their ends and provide bleed holes. Another time consuming process is that of inspecting the conduits and passages for "break through" to ensure fluid communication between the feed conduits and the core printout and between the feed conduits and the cooling passages. Typically the inspection involves threading a fibre-optic light into the feed conduits and viewing the light emitted through the cooling passages.

GB 1426049 proposes a rotor blade having a shroud, the lowermost portion of which takes the form of a shallow tray through which the airfoil section of the blade protrudes. The projecting part of the airfoil has apertures which extend from the terminations of the cooling air channels within the airfoil section to the interior of the shroud.

GB 1605335 proposes a rotor blade having a shroud containing a primary plenum chamber.

US 2001/048878 proposes a gas turbine bucket having a shroud also containing plenum chambers.

A first aspect of the invention provides a rotor blade for a gas turbine engine, the blade having:

an airfoil portion containing one or more internal conduits for the transport of cooling air therethrough, the or each conduit extending to an end of the airfoil portion, a shroud at the end of the airfoil portion for sealing the blade, in use, to a facing stationary portion of the engine, and a fillet portion which joins said end to the shroud, the fillet portion easing the transition from the outer surface of the airfoil portion to the outer surface of the shroud;

wherein the fillet portion contains a cavity which extends from the or each conduit and expands laterally relative to the or each conduit, such that the area of the cavity on a cross-section through the fillet portion perpendicular to the radial direction of the engine and at an expanding part of the cavity is greater than the area of the conduit, or the combined areas of the conduits, on a parallel cross-section at the end of the airfoil portion. Typically, the rotor blade is a turbine blade. Typically, the airfoil portion, the fillet portion and the shroud are formed as a one-piece casting.

By forming the cavity in the fillet portion it is possible to reduce the mass of the shroud, while also providing a cooling arrangement for the shroud that is effective and amenable to adaptation to different thermal boundary conditions. Feed conduits, which are conventionally located in the roots of fins for forming labyrinth seals and/or tip fences, can be avoided, which lowers manufacturing costs and can improve cooling effectiveness.

Preferably, the or each conduit and the cavity are configured such that there is no reduction in flow cross-sectional area for cooling air flowing from the or each conduit into the cavity. This helps to avoid choking of the flow in the cavity if it is necessary to increase the flow rate of cooling air.

Preferably, the cavity extends beyond the fillet portion into the shroud. Extending the cavity into the shroud facilitates the drilling of cooling air passages into the shroud to connect with the cavity. More preferably, the cavity continues to expand laterally as it extends into the shroud.

The shroud may further have one or more fins at the radially outer side thereof for forming, in use, a labyrinth seal with said facing stationary portion. The shroud may further have one or more tip fences at the radially outer side thereof.

Typically, the shroud further has a plurality of first passages through which cooling air from the cavity flows to respective exit holes on the outer surface of the shroud. In use, convection cooling by the cooling air as it flows along the first passages and/or film cooling by cooling air which exits the exit holes and flows over outer surfaces of the shroud generally provides the majority of the cooling for the shroud by the cooling air. Film cooling is usually effective only for passages that do not exit at gas-washed surfaces of the shroud.

The cavity allows many of these first passages to be shorter than the corresponding passages would be in a conventional shroud. Shorter passages tend to have improved heat transfer coefficients at positions close to the outer surface of the shroud.

Each first passage may extend in a straight line between its exit hole and a corresponding entrance hole at the cavity. This facilitates inspection of the passages for blockages, as a light source positioned in cavity can illuminate all the passages extending in a straight line from the cavity. Also, if increased cooling of the shroud is required it is a relatively simple matter to increase the number or size of such passages. There is little danger that such an increase will cause choking of the flow of cooling air, as there is no intermediate feed conduit between the cavity and the passages in which the flow may become choked. Also pressure losses produced at feed conduit/passage intersections can be avoided.

The shroud may further have one or more recesses at the outer surface thereof, at least a portion of the first passages having their exit holes at the or each recess. For example, a recess may be positioned at an edge portion of the shroud which, in use, abuts a facing edge portion of the shroud of an adjacent rotor blade, the recess preventing the exit holes thereat from being blocked by the shroud of the adjacent rotor blade. Additionally or alternatively a recess may be positioned at a downstream edge portion of the shroud, where it can reduce thermal stress distributions.

The shroud may further have one or more second passages, the or each second passage intersecting a plurality of the first passages to allow a flow of cooling air between the intersected first passages. This flow between first passages can help to reduce the growth of boundary layers and thereby improve local heat transfer coefficients.

The fillet portion may contain a plurality of cavities, each extending from a respective conduit or conduits of the airfoil portion.

Conveniently, the shapes of the or each conduit and the cavity are formed by a core which is positioned in a mould during the casting of the airfoil portion, the fillet portion and the shroud with the mould.

Indeed, a second aspect of the invention provides a method of producing the rotor blade of the first aspect, the method including the steps of:

providing a mould for the airfoil portion, the fillet portion and the shroud core, a core being positioned within the mould to form the or each conduit and the or each cavity; and casting the rotor blade with the mould.

Typically, the core has a printout section which extends from the part of the core forming the cavity, and by which the core is maintained in position within the mould. The method may further include the post-casting step of filling an opening formed in the shroud by the printout section.

The method may further include the post-casting step of drilling the passages in the shroud. For example by electro-discharge machining.

A further aspect of the invention provides a method of inspecting a rotor blade of the first aspect, the shroud having a plurality of first passages through which cooling air from the cavity flows to respective exit holes on the outer surface of the shroud, and each first passage extends in a straight line between its exit hole and a corresponding entrance hole at the cavity, the method including the steps of:

positioning a source of light in the cavity; and identifying passages which do not transmit the light through their respective exit holes. Passages identified in this way, which are likely to be blocked or malformed, can then be rectified.

DETAILED DESCRIPTION OF THE PREFERRED EMBODIMENTS

Figure 1:
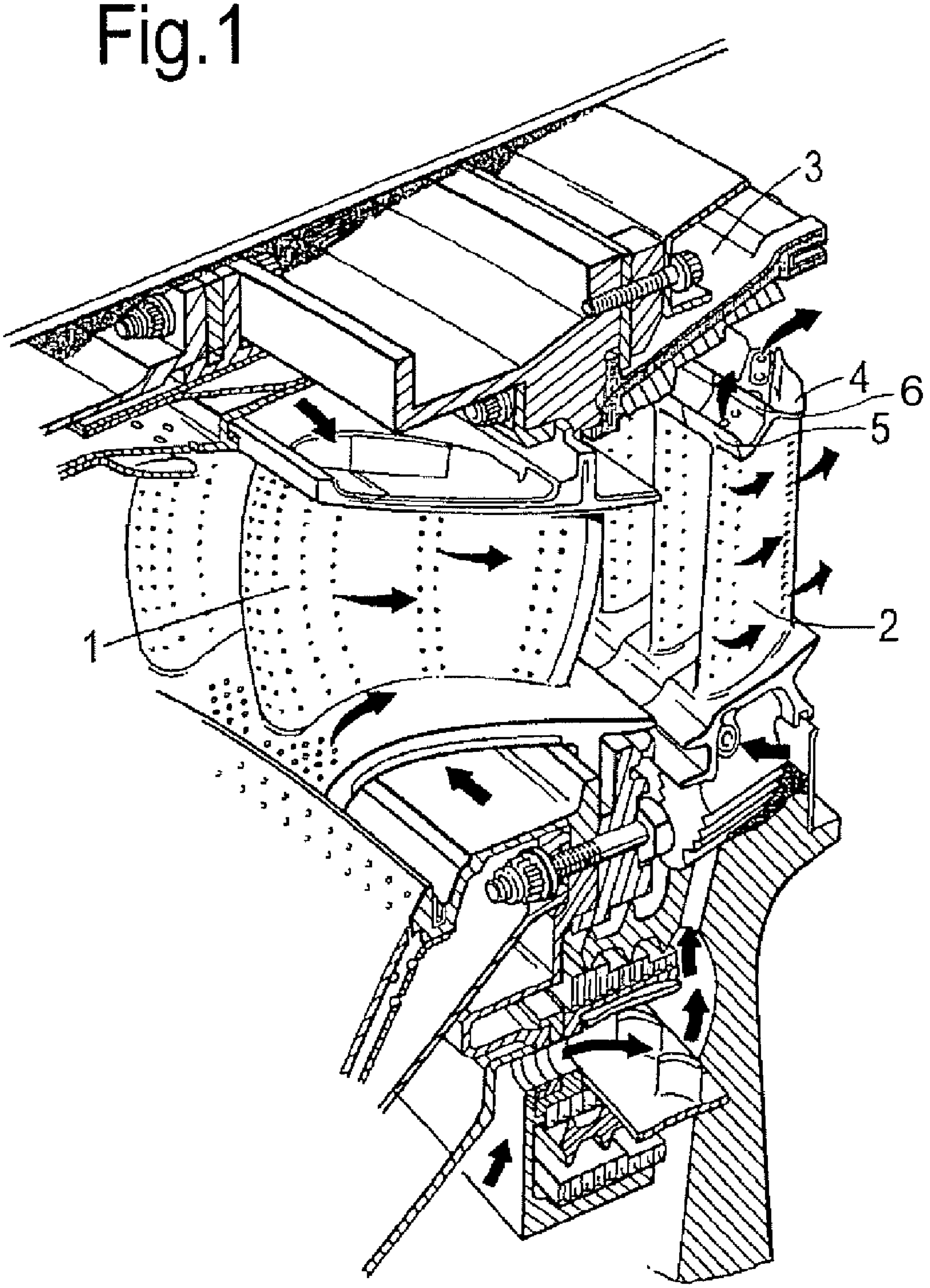
FIG. 1 shows an isometric view of a typical single stage cooled turbine.
Figure 2:
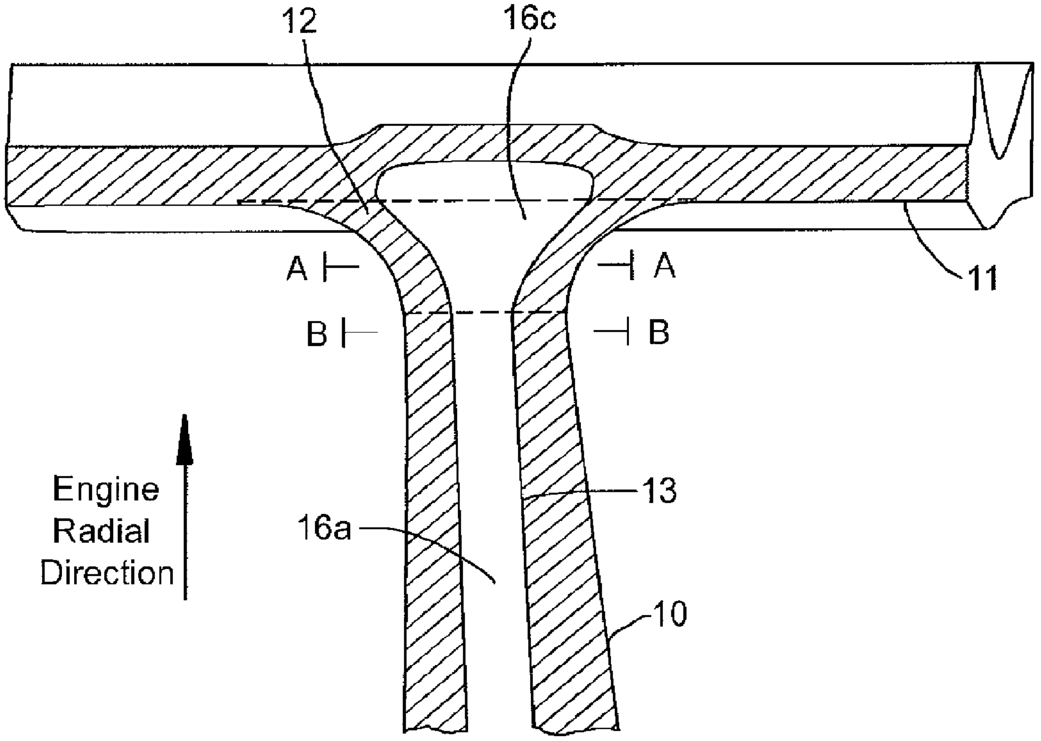
FIG. 2 shows schematically a cross-section parallel to the engine axis through the radially outer part of a rotor blade according to the present invention.

FIG. 2 shows schematically a cross-section parallel to the engine axis through the radially outer part of a rotor blade according to the present invention. The blade has an airfoil portion 10, a shroud 11 and a fillet portion 12 (whose radially inner and outer boundaries are denoted with dashed lines) which eases the transition from the outer surface of the airfoil portion to the outer surface of the shroud.

The airfoil portion contains a plurality of internal conduits which carry cooling air through the airfoil portion. The internal conduits are formed during the casting of the blade by respective ceramic cores positioned within the mould for the blade. When the cores are removed by chemical leaching after casting, the voids which they leave behind define the conduits. The airfoil portion 10, shroud 11 and fillet portion 12 can be formed as one-piece casting.

Figure 3:
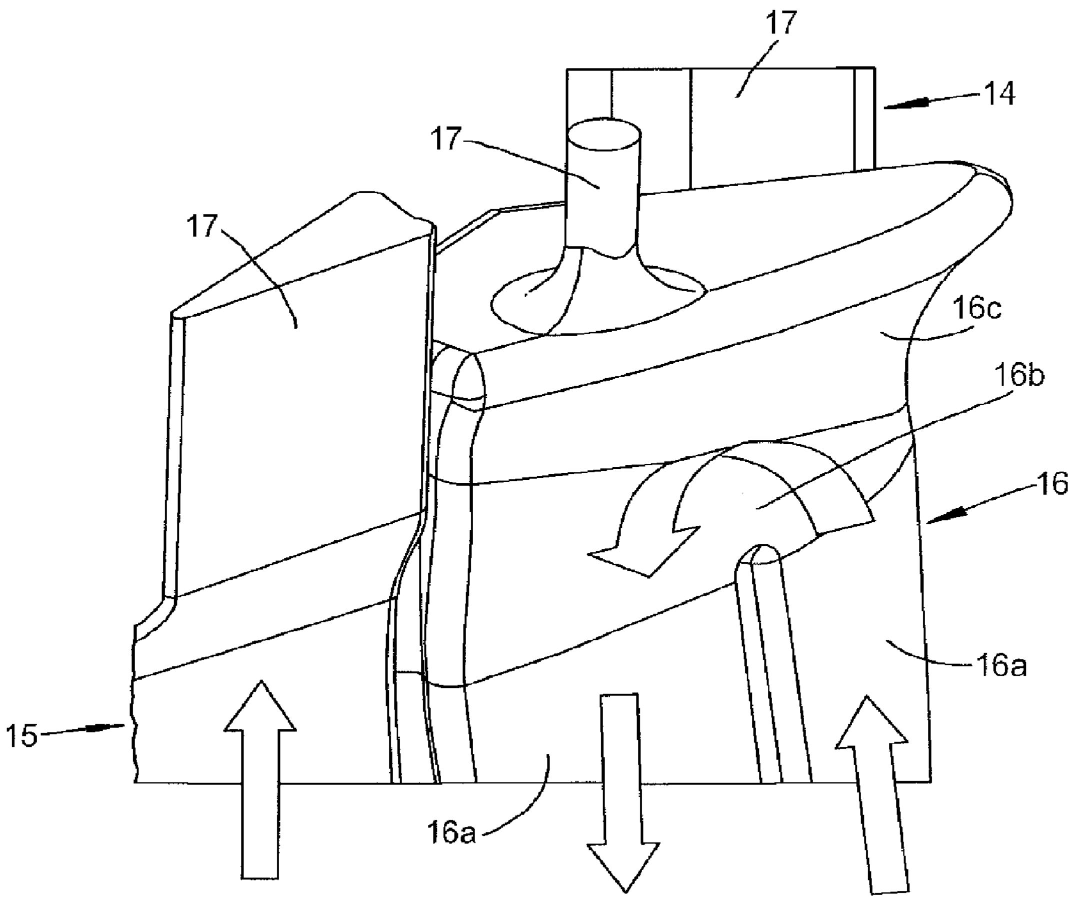
FIG. 3 shows schematically the radially outer parts of cores for the rotor blade of FIG. 2.

FIG. 3 shows schematically the radially outer parts of cores for the rotor blade of FIG. 2. The arrows overlaid on the cores indicate the direction of cooling air flow in the corresponding conduits. Leading edge 14 and trailing edge 15 cores form corresponding conduits which extend respectively along the leading and trailing edges of the airfoil portion and carry cooling air radially outwardly towards the shroud. Between the leading and trailing edge cores, mid-position core 16 has two legs which form a pair of mid-position conduits 16*a*. One of the mid-position conduits carries cooling air radially outwardly towards the shroud and the other of the mid-position conduits returns that air towards the root of the blade. A 180° bend 16*b* between the two mid-position conduits at the radially outer end of the airfoil portion allows cooling air from the "up" conduit to cross over to the "down" conduit. The cores are held in position in the mould by respective printouts 17. Because the printouts extend across the wall of the mould, they form openings in the outer surface of the shroud. These openings can be filled by a post-casting operation, using techniques familiar to the skilled person.

Radially outwardly of the 180° bend 16*b*, the mid-position core 16 has an extension which forms a cavity 16*c* in the fillet portion 12 and the shroud 11. The cavity extends from and expands laterally relative to the mid-position conduits 16*a*. As shown in FIG. 2, the expansion is such that the area of the cavity on a cross-section (e.g. A-A on FIG. 2) through the fillet portion perpendicular to the radial direction of the engine (indicated with an arrow in FIG. 2) and at an expanding part of the cavity is greater than the combined areas of the mid-position conduits on a parallel cross-section (e.g. B-B on FIG. 2) at the end of the airfoil portion.

The cavity 16*c* in the fillet portion 12 constitutes a departure from conventional cooling configurations. In FIGS. 2 and 3 the cavity is shown extending from the mid-position conduits, but similar cavities could also extend from the leading edge 14 and trailing edge 15 conduits.

By adopting the cavity 16*c*, cooling passages can be drilled directly from the external surface of the shroud to the cavity without the need for intermediate feed conduits. Also, by eliminating the lengthy flow paths and acute intersections between core printouts and feed conduits, and between feed conduits and cooling passages, the quantity of coolant passed by each cooling passage can be increased. This can augment heat transfer and reduce temperatures at the shroud extremities.

Further, the cavity 16*c*, having a larger cross-sectional area than the mid-position conduits 16*a*, avoids a reduction in flow cross-sectional area for cooling air flowing from the conduits into the cavity. It is therefore not susceptible to choking in the event it is desired to raise the overall flow rate of coolant into the shroud e.g. with a concurrent increase in the number or size of the cooling passages.

Figure 4:
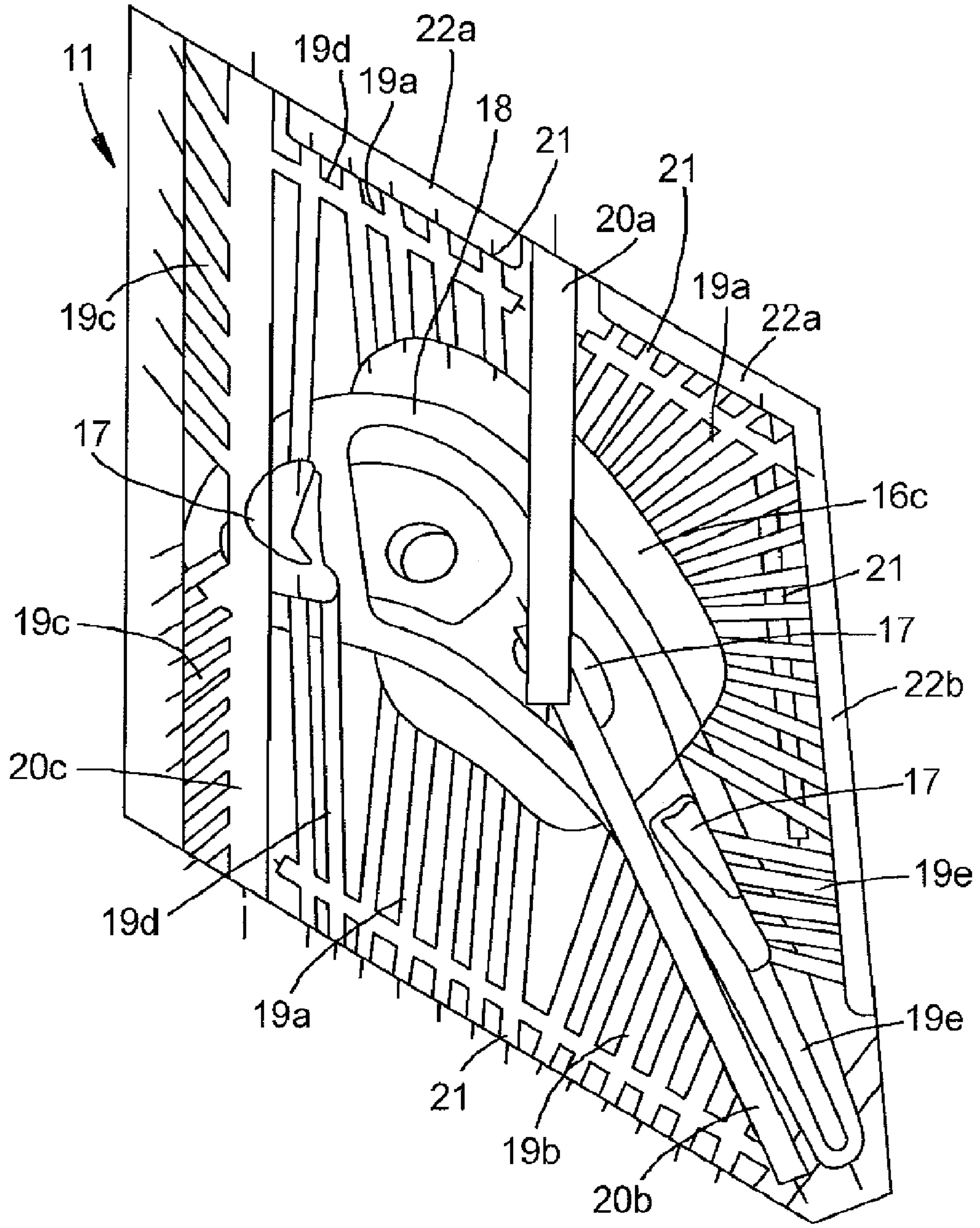
FIG. 4 is a diagram of the cooling arrangement for the shroud of FIG. 2.

FIG. 4 is a diagram of the cooling arrangement for the shroud 11 of FIG. 2, as viewed from a position radially outwardly of the outer surface of the shroud 11. Projected onto FIG. 4 are the walls 18 of the airfoil portion 10 where the airfoil portion meets the filler portion 12.

A first set of cooling passages 19*a* are drilled in straight lines between their exit holes at the outer surface of the shroud 11 and a corresponding entrance hole at the cavity 16*c*. These cooling passages are typically shorter than the corresponding cooling passages from a conventional cooling arrangement. A feed conduit 20*a* running from the printout 17 of the mid-position core is preserved in order to provide a source of cooling air from which film cooling passages could be drilled from the gas washed surface if the gas temperature was elevated to a level where they would be required. A further feed conduit 20*b* running from the printout 17 of the mid-position core is incorporated into the root of the pressure side fence to feed a second set of cooling passages 19*b*.

At the leading edge of the shroud, a third feed conduit 20*c* extends from either side of the printout 17 of the leading edge core to feed a third set of cooling passages 19*c*. Also there are some cooling passages 19*d*, 19*e* drilled directly to the printouts 17 of the leading and trailing edge cores.

Overall, the forward region and part of the rear region of the shroud are cooled largely by conventional methods, while the mid-region of the shroud and the other part of the rear region receive coolant via the cavity 16*c*. A further cavity extending from the leading edge conduit 14 could readily be incorporated in the fillet region 12, where a large fillet radius exists. Forward cooling passages could then be drilled directly into this cavity, eliminating the need for the feed conduit 20*c*.

A number of further passages or cross drillings 21 close to the shroud extremities intersect the cooling passages 19*a*, 19*b*, 19*d*. These cross drillings can restart the thermal boundary layer within the intersected passages and thereby increase the local heat transfer coefficients. Thus the cross drillings are targeted at locations where overheating is more likely to occur.

Edge recesses 22*a* on the suction side of the shroud are to ensure that the respective cooling passages are in fluid communication with the upper surface of the shroud and do not become blocked off when neighbouring shrouds are in mutual contact. Downstream edge recess 22*b* reduces the local thermal stress distribution that can be produced at the extreme downstream edge of the shroud if the respective cooling passages are drilled through a full shroud thickness at this position.

Further advantages provided by the cavity 16*c* are a reduction in the weight of the shroud, and a simplification of cooling passage inspection (a light source merely has to be introduced into the cavity, e.g. via the mid-position conduits 16*a*, to identify blockages in cooling passages 19*a*).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A rotor blade for a gas turbine engine, the blade comprising:

an airfoil portion containing at least one internal conduit for the transport of cooling air therethrough, the at least one conduit extending to an end of the airfoil portion, a shroud at the end of the airfoil portion for sealing the blade, in use, to a facing stationary portion of the engine, and a fillet portion which joins said end to the shroud, the fillet portion easing the transition from the outer surface of the airfoil portion to the outer surface of the shroud;

wherein the fillet portion contains a cavity which extends from the at least one conduit and expands laterally relative to the at least one conduit, such that the area of the cavity on a cross-section through the fillet portion perpendicular to the radial direction of the engine and at an expanding part of the cavity is greater than the area of the conduit, or the combined areas of the conduits, on a parallel cross-section at the end of the airfoil portion, wherein the shroud further has a plurality of first passages through which cooling air from the cavity flows to respective exit holes on the outer surfaces of the shroud, and wherein the shroud further has at least one or more recess at the outer surface thereof, at least a portion of the first passage having their exit holes at the at least one recess, and wherein a recess is positioned at a downstream edge portion of the shroud.

2. A rotor blade according to claim 1 wherein the airfoil portion, the fillet portion and the shroud are formed as a one-piece casting.

3. A rotor blade according claim 1 wherein the at least one conduit and the cavity are configured such that there is no reduction in flow cross-sectional area for cooling air flowing from the at least one conduit into the cavity.

4. A rotor blade according to claim 1 wherein, in use, convection cooling by the cooling air as it flows along the first passages and/or film cooling by cooling air which exits the exit holes and flows over outer surfaces of the shroud provides the majority of the cooling for the shroud by the cooling air.

5. A rotor blade according to claim 1 wherein each first passage extends in a straight line between its exit hole and a corresponding entrance hole at the cavity.

6. A rotor blade according to claim 1 wherein a recess is positioned at an edge portion of the shroud which, in use, abuts a facing edge portion of the shroud of an adjacent rotor blade, the recess preventing the exit holes thereat from being blocked by the shroud of the adjacent rotor blade.

7. A rotor blade according to claim 1 wherein the shroud further has at least one second passage, the at least one second passage intersecting a plurality of the first passages to allow a flow of cooling air between the intersected first passages.

8. A rotor blade according to claim 1 wherein the shapes of the at least one conduit and the cavity are formed by a core which is positioned in a mould during the casting of the airfoil portion, the fillet portion and the shroud with the mould.

9. A method of producing the rotor blade of claim 1, the method including the steps of:

providing a mould for the airfoil portion, the fillet portion and the shroud, a core being positioned within the mould to form the at least conduit and the at least one cavity; and casting the rotor blade with the mould.

10. A method according to claim 9 wherein the core has a printout section which extends from the part of the core forming the cavity, and by which the core is maintained in position within the mould.

11. A method of inspecting the rotor blade of claim 5, the method including the steps of:

positioning a source of light in the cavity; and identifying first passages which do not transmit the light through their respective exit holes.

* * * * *